A. BISKO.
COMBINATION TOOL.
APPLICATION FILED JAN. 6, 1913.
1,061,352.
Patented May 13, 1913.
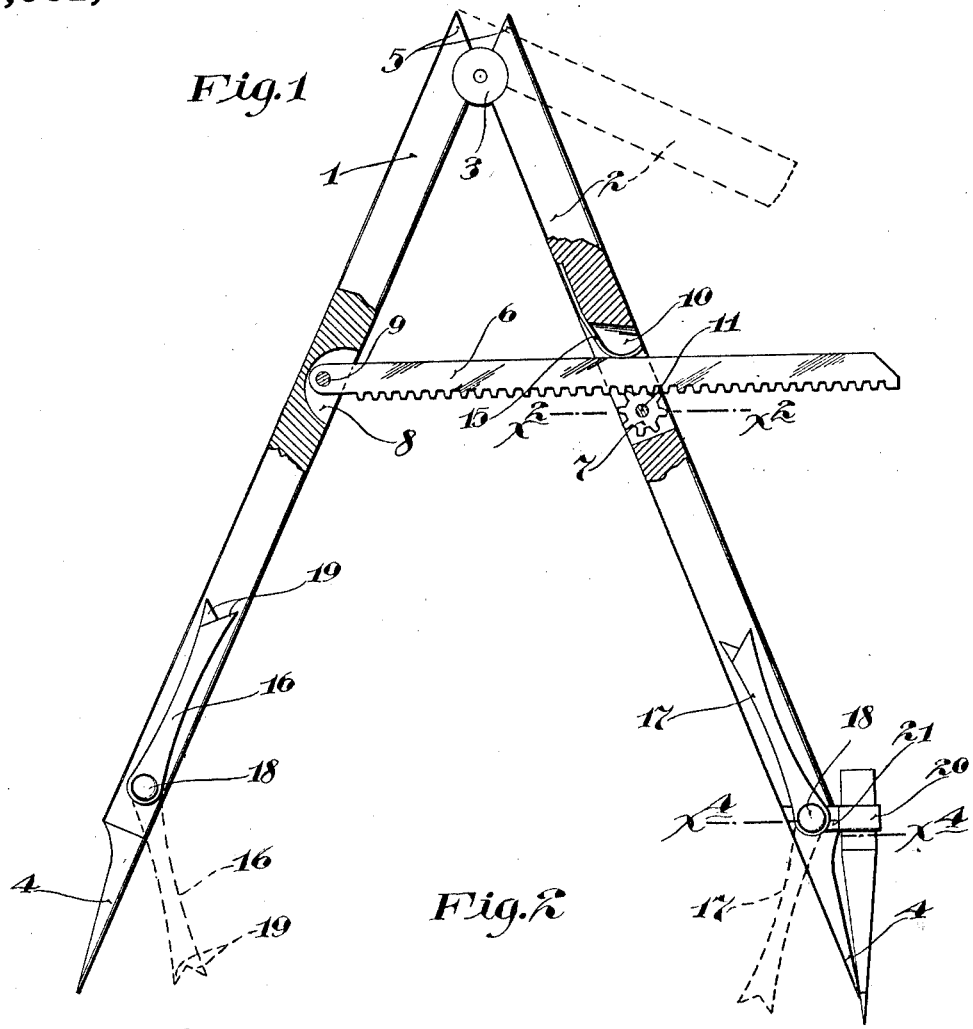
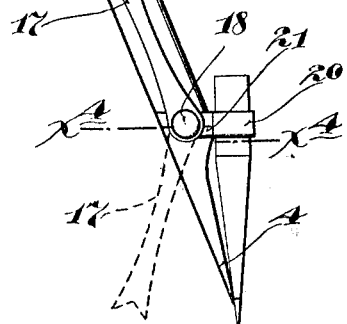
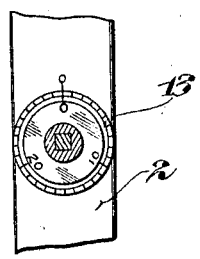
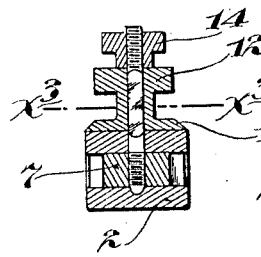
Witnesses:
E. C. Skinkle
A. H. Opsahl
Inventor:
Andrew Bisko
By his Attorneys:
Williamson & Merchant

UNITED STATES PATENT OFFICE.

ANDREW BISKO, OF MINNEAPOLIS, MINNESOTA.

COMBINATION-TOOL.

1,061,352.   Specification of Letters Patent.   Patented May 13, 1913.

Application filed January 6, 1913. Serial No. 740,408.

*To all whom it may concern:*

Be it known that I, ANDREW BISKO, a citizen of the United States, residing at Minneapolis, in the county of Hennepin and State of Minnesota, have invented certain new and useful Improvements in Combination-Tools; and I do hereby declare the following to be a full, clear, and exact description of the invention, such as will enable others skilled in the art to which it appertains to make and use the same.

My invention relates to improvements in combination tools, and has for its object to provide a device of this character which may be readily adapted for use either as a compass, divider, inside or outside calipers, square, or other similar tool.

To the above ends, the invention consists of the novel devices and combinations of devices hereinafter described and defined in the claims.

The invention is illustrated in the accompanying drawings, wherein like characters indicate like parts throughout the several views.

Referring to the drawings: Figure 1 is a side elevation of the improved combination tool, some parts being broken away, some of the exposed parts being shown in section, and other parts being shown in different positions by means of dotted lines; Fig. 2 is a transverse section taken on the line $x^2$ $x^2$ of Fig. 1; Fig. 3 is a transverse section taken on the line $x^3$ $x^3$ of Fig. 2; and Fig. 4 is a transverse section taken on the line $x^4$ $x^4$ of Fig. 1.

The numerals 1 and 2 indicate a pair of legs pivotally connected, at one of their ends, by a hinge joint 3, with their other ends terminating in long sharp divider points 4. The hinged ends of the legs 1 and 2 are extended slightly beyond the hinge joint 3 and cut on a bevel of 90 degrees, extending to the axis of the hinge joint 3 to afford stops 5. The stops 5, when brought together, as shown by dotted lines in Fig. 1, hold the legs 1 and 2 at right angles to each other, thereby permitting the improved tool to be used as a square.

A rack bar 6 and coöperating pinion 7 are provided for setting and locking the legs 1 and 2 in different angular adjustments with respect to each other. One end of the rack bar 6 is seated in a recess 8 formed in the inner longitudinal face of the leg 1, and is pivotally secured to said leg by a pin 9. The free end of this rack bar 6 works through a longitudinally extended slot 10 formed in the leg 2. The pinion 7 meshing with the rack bar 6 is rigidly secured to a shaft 11 passed through the slot 10 and loosely journaled in the adjacent sections of the leg 2. A thumb piece 12 is provided for rotating the pinion 7, to impart endwise movement to the rack bar 6, for opening and closing the legs 1 and 2. This thumb piece 12 is mounted on the projecting end of the shaft 11 for rotation therewith, but with freedom for endwise movement thereon. That portion of the shaft 11 which projects within the thumb piece 12 is formed square in cross section, and fits a correspondingly formed seat in the said thumb piece.

To adapt the improved tool for use as a protractor, the base of the thumb piece 12 terminates in an annular dial plate 13, having a beveled periphery, graduated into thirty degrees which coöperates with a zero mark on the leg 2. Obviously, it takes three complete revolutions of the dial 13 to move the legs 1 and 2 from their closed or zero position to a position in which they extend at right angles to each other. The inner faces of the legs 1 and 2 intersect the axis of the hinge joint 3 and when the improved tool is used as a protractor, these faces are used in measuring the degrees.

For locking the legs 1 and 2 in different adjustments, a set nut 14 is provided and has screw threaded engagement with the projecting end of the shaft 11, outside of the thumb piece 12. By the adjustment of this thumb nut 14, the dial 13 and the pinion 7 are frictionally clamped on opposing faces of the leg 2 and thereby hold the legs 1 and 2 where set. A spring 15, anchored to the leg 2, yieldingly holds the rack bar 6 in mesh with the pinion 7.

To permit the improved tool to be used as a caliper, a pair of swinging arms 16 and 17 are pivotally secured, at one of their ends, respectively, to the legs 1 and 2, by adjusting screws 18, having knurled heads. By the adjustment of these screws 18, the arms 16 and 17 may be frictionally clamped, at will, in different set adjustments of the legs 1 and 2. At their free ends, the arms 16 and 17 terminate in reversely projecting tooth-like points 19, and when said arms are turned as indicated by dotted lines in Fig. 1, the same afford inside and outside calipers. These tooth-like points 19, as shown, are preferably laterally offset one from the other, to permit a measurement to be taken with a scale between the corresponding teeth on the arms 16 and 17.

A pencil holder 20 for holding the pencil Z is attached to the set screw 18 of the leg 2, and comprises a transversely divided annular flat spring metal band, having its end portions 21 bent outward and extended parallel to each other. These end portions 21 are provided with coincident perforations through which the said set screw is loosely passed. The end portions 21 of the pencil holder 20 project between the leg 2 and arm 17, and at the same time that the said arm is clamped onto the leg 2, by the set screw 18, said pencil holder is also frictionally clamped around the pencil and between the leg 2 and arm 17.

The above described device, while extremely simple and of comparatively small cost to manufacture, is thought to be highly efficient for the purpose had in view.

What I claim is:

1. The combination with a pair of legs connected by a hinge joint and having divider points, of means for setting said legs in different angular adjustments with respect to each other, a pair of caliper arms pivotally secured to said legs, a pencil holder secured to one of the pivotal connections of said arms, and means for holding said arms in different pivotal adjustments on said legs.

2. The combination with a pair of legs connected by a hinge joint and having divider points, of a coöperating rack bar and pinion secured, one to each of said legs, a thumb piece for rotating said pinion and having a graduated dial for setting said legs in predetermined adjustments with respect to each other.

In testimony whereof I affix my signature in presence of two witnesses.

ANDREW BISKO.

Witnesses:
E. C. SKINKLE,
HARRY D. KILGORE.

Copies of this patent may be obtained for five cents each, by addressing the "Commissioner of Patents, Washington, D. C."